Oct. 23, 1945.   A. RYBA   2,387,613
ELECTROMAGNETIC MULTIPLE-DISK CLUTCH
Filed Dec. 9, 1939   2 Sheets-Sheet 1

Inventor,
A. Ryba
by Glascock Downing & Seebold

Oct. 23, 1945.　　　A. RYBA　　　2,387,613
ELECTROMAGNETIC MULTIPLE-DISK CLUTCH
Filed Dec. 9, 1939　　　2 Sheets-Sheet 2

Patented Oct. 23, 1945

2,387,613

UNITED STATES PATENT OFFICE 2,387,613

ELECTROMAGNETIC MULTIPLE-DISK CLUTCH

Anton Ryba, Bolzano, Italy; vested in the Alien Property Custodian

Application December 9, 1939, Serial No. 308,479
In Germany November 24, 1936

1 Claim. (Cl. 192—84)

The present invention relates to electromagnetic multiple-disk clutches particularly adapted for use in the gearing of motor vehicles.

Clutches of this kind hitherto were not adapted to fulfill practical requirements owing to too small specific efficiency, too small durability and annoying remanence phenomena.

The object of my invention which is a continuation in part of my copending U. S. application Ser. No. 176,339, filed November 24, 1937, for "Electromagnetic multiple-disk clutches," is to provide an electromagnetic multiple-disk clutch which obviates the above-mentioned deficiencies. To this purpose my clutch is provided with disks consisting of ferromagnetic material tempered to about 40 degrees Rockwell, said disks being so thin that on a magnetic force acting upon them they elastically yield and mutually are shifted to perfectly bear against each other. I have found that on cutting out the current such thin and tempered disks mutually disengage without any remanence action and that such disks, moreover, have the required resistance to wear to render the clutch usable to the highest degree for all practical purposes.

Disks made as explained above may be used in clutches in which the magnetic flux once only traverses the set of disks in an axial direction as well as in clutches in which the magnetic flux traverses the disks twice in an axial direction. In the latter case the disks in the annular zone of the exciting coil are provided with a number of perforations.

Ferromagnetic materials suitable for the manufacture of the clutch disks are well known. For instance I have found that kinds of steel having about 0.7% carbon, 0.25% silicon, 0.5% manganese and some thousandths of sulphur and phosphorus are extremely suitable.

To direct the magnetic flux mainly in an axial direction through the disks a notched sleeve of non-magnetisable material is provided into which engage the inner disks.

To reduce as far as possible the losses due to idle running of clutches running in oil, the use of well known means is recommended, for instance deforming the disks by means of hollow presses, corrugating or simply bending or inserting of resilient members.

In the accompanying drawings some constructions of clutches according to the invention are shown by way of example.

Figure 1:
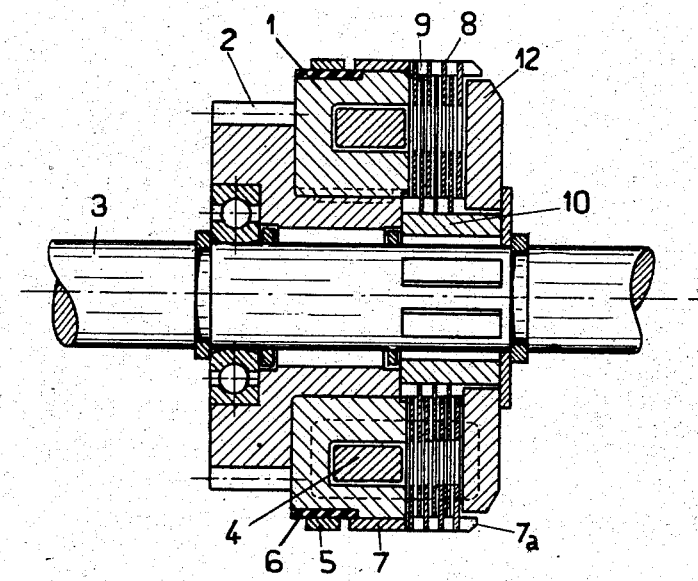
Figure 2:
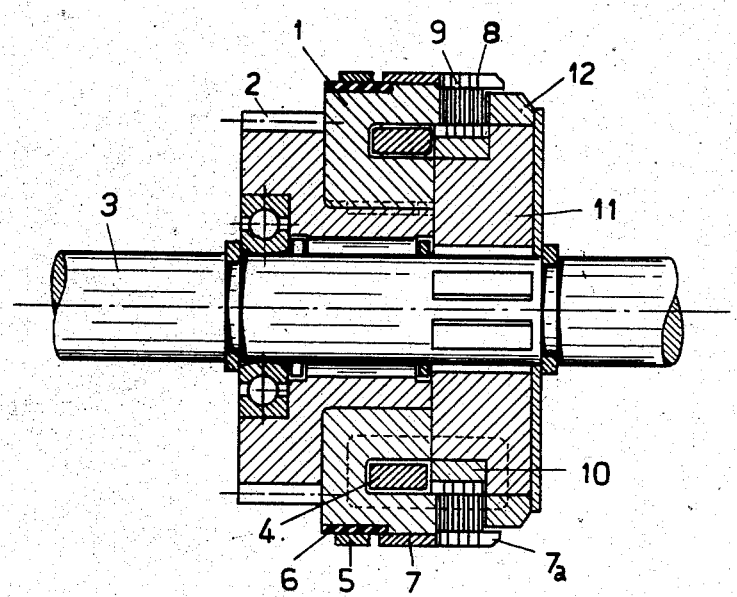
Figure 3:
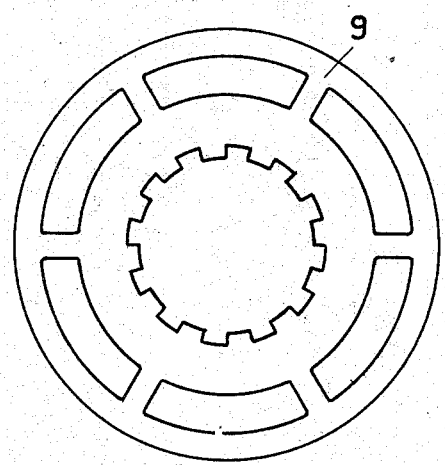
Figure 4:
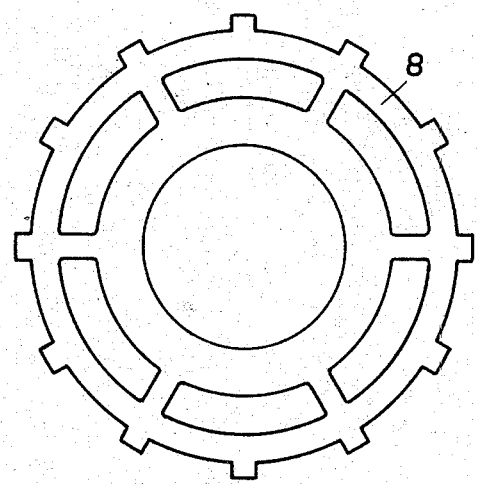
Figure 5:
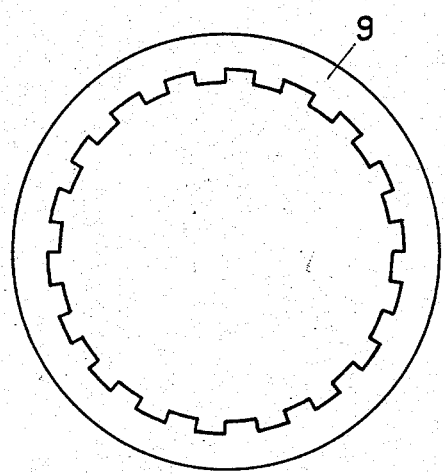
Figure 6:
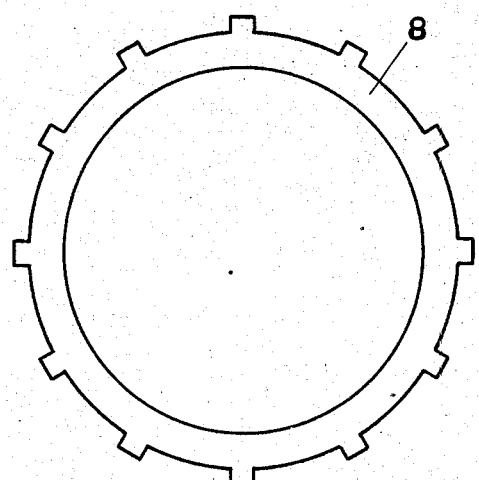

In these drawings:

Fig. 1 is a longitudinal section through a clutch in which the magnetic flux twice traverses the set of disks, Fig. 2 shows a longitudinal section through a clutch in which the magnetic flux only once traverses the set of disks, Fig. 3 is a view of an inner disk of the clutch according to Fig. 1, Fig. 4 is a view of an outer disk of the clutch illustrated in Fig. 1, Fig. 5 is a view of an inner disk of the clutch shown in Fig. 2, and Fig. 6 is a view of an outer disk of the clutch illustrated in Fig. 2.

As may be seen from the drawings, the electromagnet 1 is connected to a gear wheel 2 which is rotatably mounted upon the shaft 3. In the concentric annular space of the electromagnet 1 an exciting coil 4 is inserted, the terminals of which are connected to the body of the clutch on the one hand and to a slip-ring 5 on the other hand. The latter is pressed upon the electromagnet 1 and an insulating layer 6 being interposed between the ring 5 and the electromagnet 1. Also fixed upon the electromagnet 1 is a ring 7 which is provided with projections or dogs 7a cooperating with the outer disks 8. The inner disks 9 engage into a notched sleeve 10 consisting of a preferably non-magnetisable material. This sleeve in the construction shown in Fig. 1 is directly connected to the shaft 3, whereas said sleeve in the construction shown in Fig. 2 is fixed to a ferromagnetic sleeve 11. The sleeve 11 is connected to the shaft 3 and has an armature 12 mounted upon its outer periphery. At the surface of contact with the armature 12, the outer diameter of the sleeve 11 is as large as that of the non-magnetic sleeve 10. The armature 12 serves as return path for the magnetic flux. The disks shown in Figs. 3 and 4 belong to the clutch illustrated in Fig. 1 and in the annular zone of the exciting coil are provided with a row of perforations. The disks shown in Figs. 5 and 6 belong to the clutch illustrated in Fig. 2 and are formed as simple narrow rings.

If current traverses the coil 4 a magnetic field is produced in the sense of the dotted line which traverses the disks and causes the thin tempered disks to perfectly bear against each other, whereby the two members of the clutch are connected together by friction. On cutting out the current the remanence is opposed by the multiple subdivision of the set of disks, the low thickness of the disks as well as the elastic reaction of the disks.

What I claim is:

An electromagnetic multiple-disk clutch, a pair of rotary clutch members, an electromagnet including an annular exciting winding on one of said clutch members, a sleeve made of ferromagnetic material forming part of the other clutch member, a splined sleeve made of non-magnetic material secured to said ferro-magnetic sleeve approximately opposite to said exciting winding, an outer set of thin, elastic disks made of tempered ferro-magnetic material, teeth on the outer perimeter of each disk in the outer set for connecting such disks to the clutch member with the electromagnet, an inner set of thin, elastic disks made of tempered ferro-magnetic material, the disks of the inner set alternating with the disks of the outer set, and teeth on the inner perimeter of each disk in the inner set for operatively connecting them to said non-magnetic splined sleeve, said disks of said inner set and said outer set leaving air-gaps between two adjacent disks when demagnetized and adapted to bear against each other by yielding in response to the increasing axial pressure of the magnetic force due to their elasticity, thus substantially eliminating said air-gaps, an armature mounted to slide axially on said ferro-magnetic sleeve approximately opposite to said disks and means for limiting the sliding movement of said armature away from said disks.

ANTON RYBA.